(12) United States Patent
Yamaguchi et al.

(10) Patent No.: US 10,116,193 B2
(45) Date of Patent: Oct. 30, 2018

(54) INTERIOR PERMANENT MAGNET ROTOR AND METHOD AND APPARATUS FOR MANUFACTURING THE SAME

(71) Applicant: JTEKT CORPORATION, Osaka-shi, Osaka (JP)

(72) Inventors: Ryosuke Yamaguchi, Kariya (JP); Keita Nimura, Okazaki (JP); Koji Tachi, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 402 days.

(21) Appl. No.: 14/921,507

(22) Filed: Oct. 23, 2015

(65) Prior Publication Data

US 2016/0126792 A1 May 5, 2016

(30) Foreign Application Priority Data

Oct. 30, 2014 (JP) ................................. 2014-221815
Jun. 4, 2015 (JP) ................................. 2015-114082

(51) Int. Cl.
*H02K 1/27* (2006.01)
*H02K 15/03* (2006.01)
*H02K 15/12* (2006.01)

(52) U.S. Cl.
CPC .......... *H02K 15/03* (2013.01); *H02K 1/2766* (2013.01); *H02K 15/12* (2013.01)

(58) Field of Classification Search
CPC ........ H02K 15/03; H02K 15/12; H02K 1/276; H02K 1/2766
USPC ........ 310/43, 44, 45, 12.26, 154.23, 154.21, 310/156.38, 156.39, 156.53
See application file for complete search history.

(56) References Cited

U.S. PATENT DOCUMENTS

| 6,768,238 | B2 * | 7/2004 | Knauff | ................. | H02K 1/2773 |
| | | | | | 310/156.53 |
| 8,760,025 | B2 * | 6/2014 | Rahman | ............... | H02K 1/2766 |
| | | | | | 310/156.38 |
| 8,791,610 | B2 * | 7/2014 | Kim | ..................... | H02K 11/215 |
| | | | | | 310/68 B |
| 9,780,610 | B2 * | 10/2017 | Yamada | ................. | H02K 1/243 |
| 2002/0047409 | A1 * | 4/2002 | Hiroyuki | ............... | H02K 15/03 |
| | | | | | 310/100 |

(Continued)

FOREIGN PATENT DOCUMENTS

| EP | 1 176 700 A2 | 1/2002 |
| EP | 2 782 216 A2 | 9/2014 |
| JP | 2002-044915 A | 2/2002 |

OTHER PUBLICATIONS

Jun. 28, 2016 Extended European Search Report issued in European Patent Application No. 15191951.1.

*Primary Examiner* — Forrest M Phillips
(74) *Attorney, Agent, or Firm* — Oliff PLC

(57) ABSTRACT

An interior permanent magnet rotor includes a cylindrical rotor core having an axial hole extending in an axial direction, and a resin magnet that is formed to fill the axial hole by injection molding and that has a pair of axial end faces. The resin magnet includes a linear portion that has a linear shape in section perpendicular to the axial direction of the rotor core. The linear portion has a first end and a second end located closer to an outer periphery of the rotor core than the first end is. A gate mark is located on the second end of the linear portion on at least one of the axial end faces of the resin magnet.

6 Claims, 8 Drawing Sheets

(56) References Cited

U.S. PATENT DOCUMENTS

| | | | | |
|---|---|---|---|---|
| 2014/0042834 A1* | 2/2014 | Asahi | ............... | H02K 1/04 |
| | | | | 310/43 |
| 2014/0225469 A1* | 8/2014 | Yoshikawa | ......... | H02K 1/2773 |
| | | | | 310/156.53 |
| 2015/0303749 A1* | 10/2015 | Okubo | ............... | H02K 29/03 |
| | | | | 310/156.38 |
| 2016/0111945 A1* | 4/2016 | Yamaguchi | ............ | H02K 15/03 |
| | | | | 29/598 |
| 2016/0380492 A1* | 12/2016 | Kawasaki | ............ | H02K 1/2766 |
| | | | | 310/156.11 |

* cited by examiner

INTERIOR PERMANENT MAGNET ROTOR AND METHOD AND APPARATUS FOR MANUFACTURING THE SAME

INCORPORATION BY REFERENCE

The disclosure of Japanese Patent Application No. 2014-221815 filed on Oct. 30, 2014 and No. 2015-114082 filed on Jun. 4, 2015 including the specification, drawings and abstract, is incorporated herein by reference in its entirety.

BACKGROUND OF THE INVENTION

1. Field of the Invention

The present invention relates to interior permanent magnet (IPM) rotors and methods and apparatuses for manufacturing the same.

2. Description of the Related Art

Interior permanent magnet (IPM) motors having permanent magnets embedded in a rotor are known in the art. A technique of using resin magnets containing well-known ferromagnetic powder and a resin binder is known as interior permanent magnet (IPM) rotors that are used for such IPM motors. For example, in Japanese Patent Application Publication No. 2002-44915 (JP 2002-44915 A), a molten resin magnet material is introduced into slits of a cylindrical rotor placed in a mold while being magnetically oriented by permanent magnets in the mold.

Each slit has an arc shape in section and has a pair of ends and a bottom portion. The ends are located close to the outer periphery of a rotor core. The bottom portion is located inward of the ends in the radial direction of the rotor core. Gates provided in the mold in order to inject the resin magnet material therethrough are located so as to face the bottom portion in the axial direction of the rotor core.

The resin magnet material that is introduced into the slits has a lower orientation rate and a lower magnetization rate in the bottom portion than in the ends. Each resin magnet formed as the resin magnet material injected through the gate becomes solidified in the slit includes a high magnetization portion and a low magnetization portion. The high magnetization portion is formed as the resin magnet material moves from the bottom portion to the ends and thus becomes solidified at a high orientation rate and a high magnetization rate. The low magnetization portion is formed as the resin magnet material stays around the bottom portion and thus becomes solidified at a low orientation rate and a low magnetization rate.

Accordingly, the overall magnetization rate of the resin magnet is reduced, and the overall magnetic flux density of the rotor is reduced. This reduces the effective amount of magnetic flux crossing a stator coil of the motor, which causes reduction in output torque of the rotor.

SUMMARY OF THE INVENTION

It is one object of the present invention to provide an interior permanent magnet rotor having high overall magnetic flux density and a method and an apparatuses for manufacturing the same.

According to an aspect of the present invention, an interior permanent magnet rotor includes: a cylindrical rotor core having an axial hole; and a resin magnet that is formed to fill the axial hole by injection molding and that has a pair of axial end faces. The resin magnet includes a linear portion that has a linear shape in section perpendicular to an axial direction of the rotor core and that has a first end and a second end located closer to an outer periphery of the rotor core than the first end is. A gate mark is located on the second end of the linear portion on at least one of the axial end faces of the resin magnet.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1A:
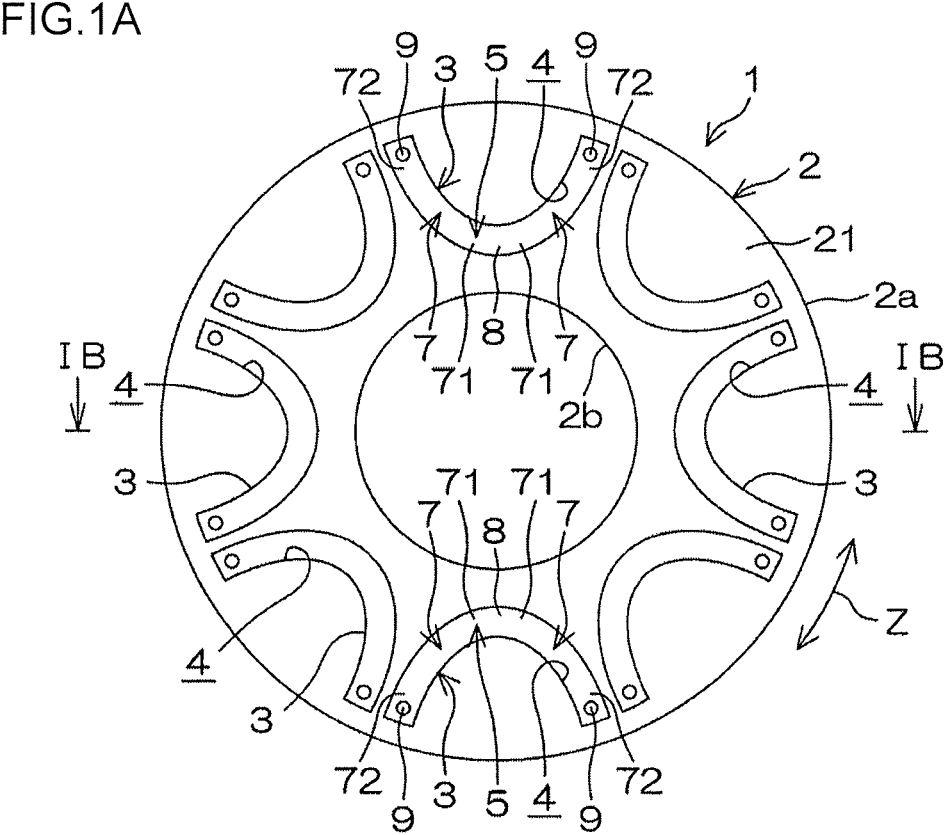
FIG. 1A is a plan view of an interior permanent magnet rotor according to a first embodiment of the present invention.
Figure 1B:
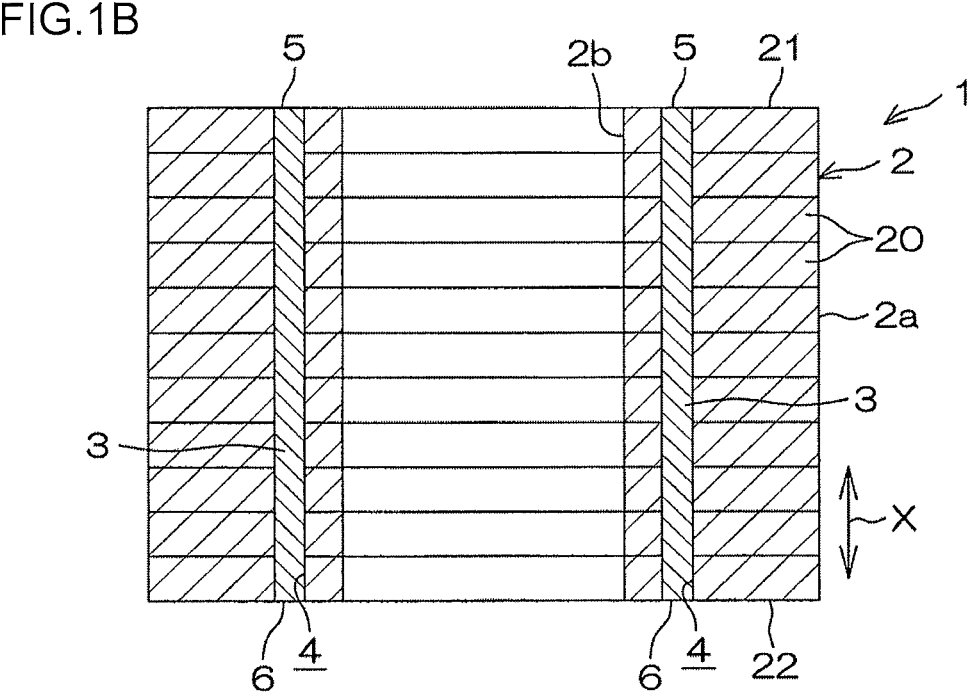
FIG. 1B is a sectional view taken along line 1B-1B in FIG. 1A.
Figure 2:
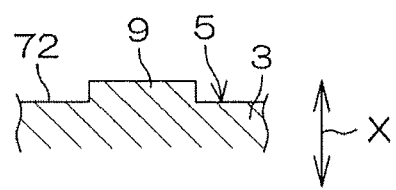
FIG. 2 is an enlarged sectional view of a region around a gate mark according to the first embodiment.

Embodiments of the present invention will be described below with reference to the accompanying drawings. A first embodiment of an interior permanent magnet (IPM) rotor and a manufacturing method thereof according to the present invention will be described with reference to FIGS. 1 to 7. FIGS. 1A and 1B are a plan view and a sectional view of the IPM rotor according to the first embodiment of the present invention. FIG. 2 is a bottom view of the IPM rotor. Referring to FIGS. 1A and 1B, an IPM rotor 1 includes a cylindrical rotor core 2 and a plurality of resin magnets 3. The resin magnets 3 are embedded in the rotor core 2. As used herein, the "resin magnet" means a magnet including well-known ferromagnetic powder and a resin binder.

As shown in FIG. 1B, the rotor core 2 is formed by stacking multiple annular electromagnetic steel sheets 20 in the axial direction X. As shown in FIGS. 1A and 1B, the rotor core 2 includes an outer peripheral surface 2a, an inner peripheral surface 2b, a first axial end face 21, a second axial end face 22, and a plurality of axial holes 4. The axial holes 4 are disposed at regular intervals in the circumferential direction Z and extend through the rotor core 2 in the axial direction X to the axial end faces 21, 22.

Each resin magnet 3 is formed by injection molding so as to fill a corresponding one of the axial holes 4. Each resin magnet 3 includes a first axial end face 5 and a second axial end face 6 which face each other in the axial direction X.

As shown in FIG. 1A, each resin magnet 3 includes a pair of linear portions 7 having a linear shape in section (not shown) perpendicular to the axial direction X of the rotor core 2. The linear portions 7 of each resin magnet 3 adjoin each other in the circumferential direction Z of the rotor core 2. Each linear portion 7 has a first end 71 and a second end 72. The second end 72 is located closer to the outer periphery of the rotor core 2 than the first end 71 is.

Each resin magnet 3 includes a bottom portion 8 connecting the first ends 71 of the linear portions 7 adjoining each other in the circumferential direction Z. Each resin magnet 3 thus has a V-shape, a U-shape, or an arc shape in section perpendicular to the axial direction X of the rotor core 2. A gate mark 9 is formed on each of the second ends 72 of the linear portions 7 on the first axial end face 5 of each resin magnet 3. The gate mark 9 is a shear mark formed when the resin magnet 3 is separated from the resin of a gate portion after injection molding. The gate mark 9 has a protruding shape as shown in FIG. 2. There is no gate mark on the second axial end face 6 of each resin magnet 3.

Figure 3A:
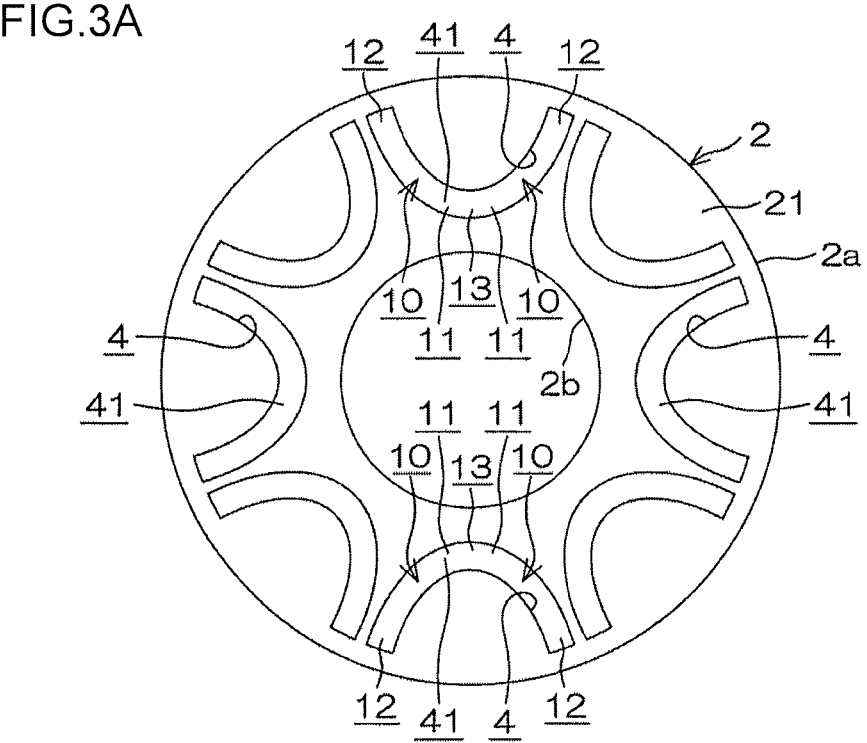
FIG. 3A is a plan view of a rotor core according to the first embodiment.
Figure 3B:
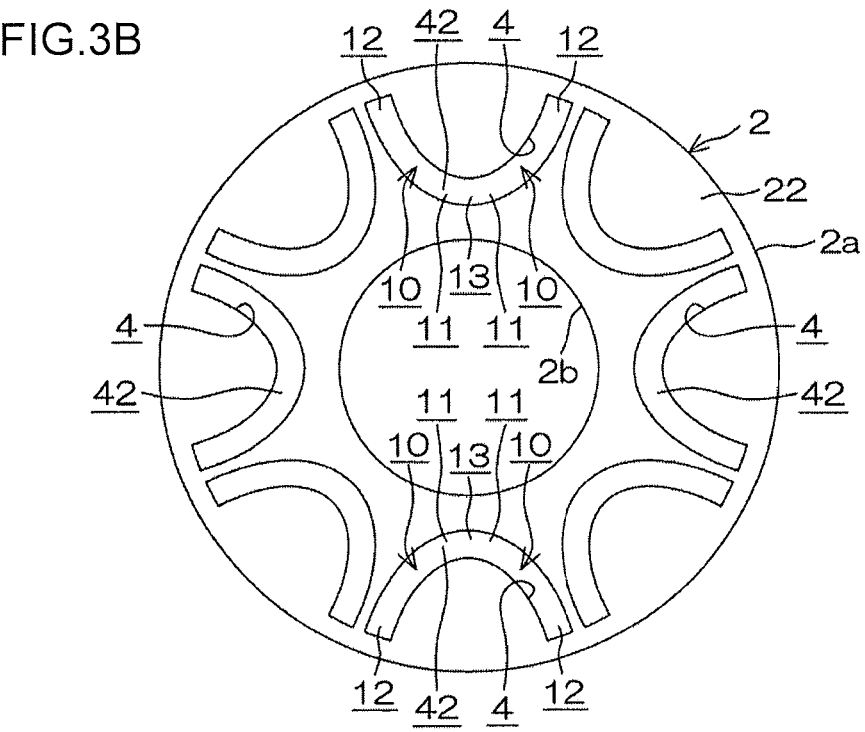
FIG. 3B is a bottom view of the rotor core according to the first embodiment.

FIGS. 3A and 3B are a plan view and a bottom view showing only the rotor core 2. As shown in FIGS. 3A and 3B, each axial hole 4 includes a first opening 41 and a second opening 42. The first opening 41 opens at the first axial end face 21 of the rotor core 2. The second opening 42 opens at the second axial end face 22 of the rotor core 2. Each axial hole 4 includes a pair of linear portions 10 having a linear shape in section (not shown) perpendicular to the axial direction of the rotor core 2. The linear portions 10 of each axial hole 4 adjoin each other in the circumferential direction Z of the rotor core 2. Each linear portion 10 has a first end 11 and a second end 12. The second end 12 is located closer to the outer periphery of the rotor core 2 than the first end 11 is.

Each axial hole 4 includes a bottom portion 13 connecting the first ends 11 of the linear portions 10 adjoining each other in the circumferential direction Z. Each axial hole 4 thus has a V-shape, a U-shape, or an arc shape in section perpendicular to the axial direction X of the rotor core 2. The openings 41, 42 of each axial hole 4 of the rotor core 2 shown in FIGS. 3A and 3B are closed by the axial end faces 5, 6 of a corresponding one of the resin magnets 3 shown in FIGS. 1A and 1B.

Figure 4:
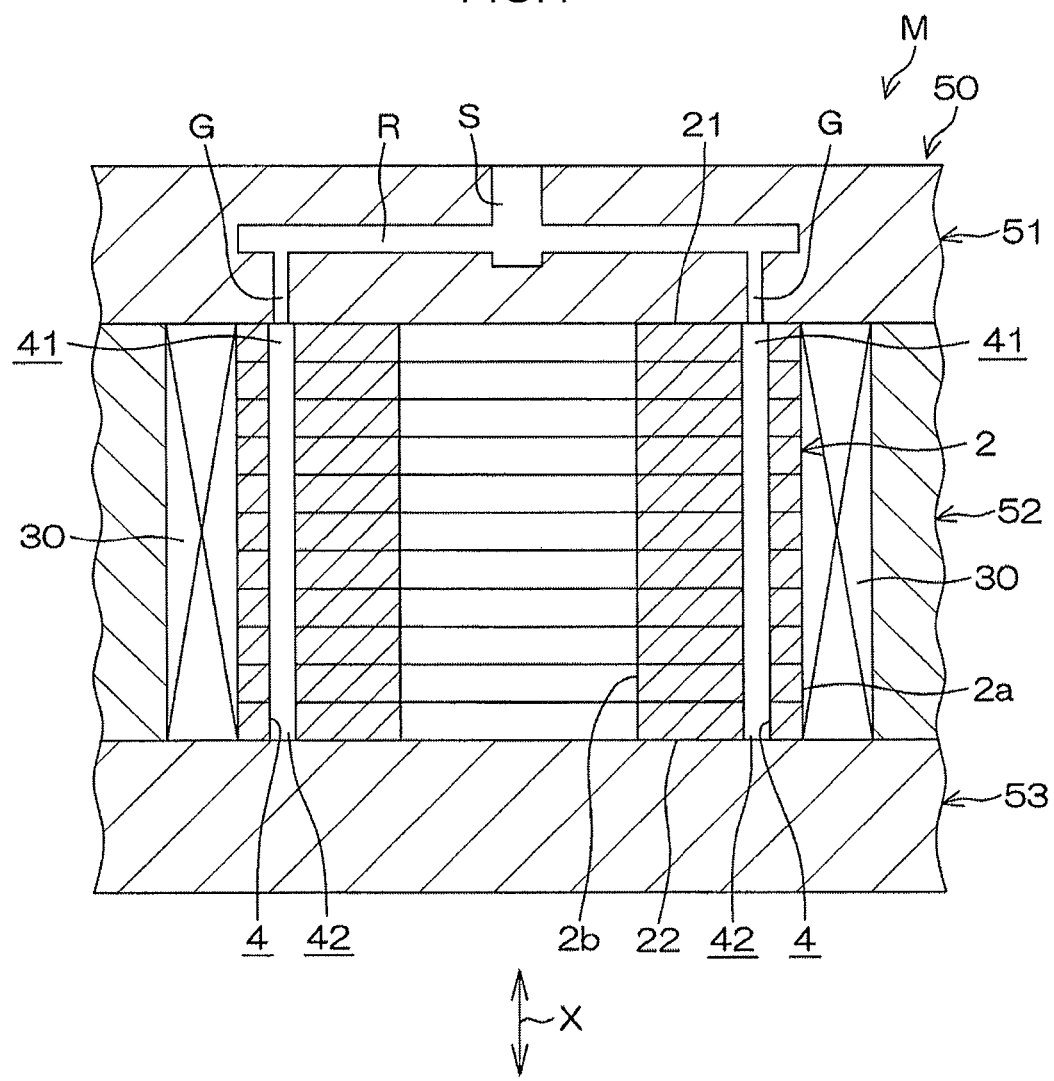
FIG. 4 is a process drawing showing the state where the rotor core is placed in a mold according to the first embodiment.

A method for manufacturing the IPM rotor 1 according to the first embodiment will be described below. First, as shown in FIG. 4, the rotor core 2 is placed in a mold 50 of an apparatus M for manufacturing an IPM rotor. The mold 50 includes an upper mold 51, an intermediate mold 52, and a lower mold 53. The upper mold 51 faces the first axial end face 21 of the rotor core 2. The intermediate mold 52 surrounds the rotor core 2. The lower mold 53 faces the second axial end face 22 of the rotor core 2.

Figure 5:
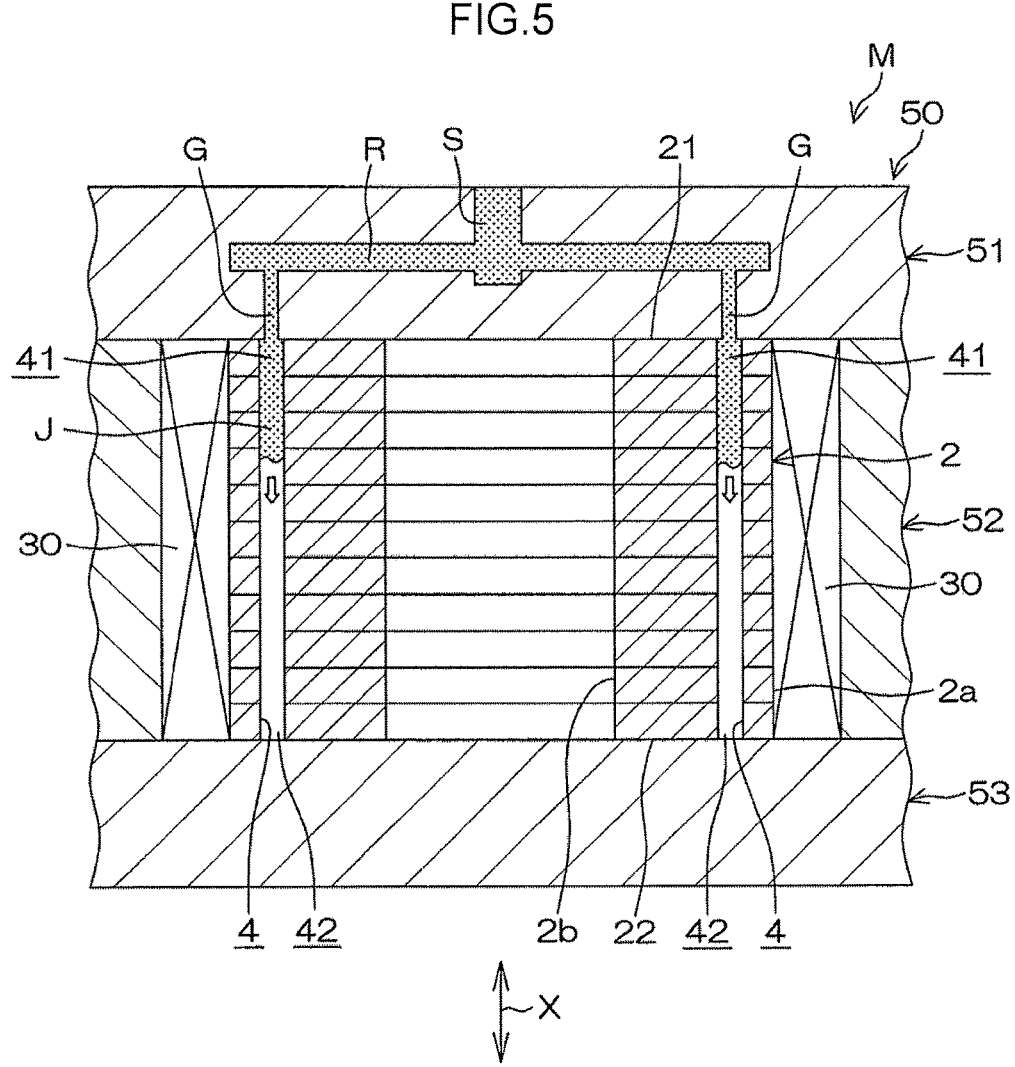
FIG. 5 is a process drawing showing the state during injection of a resin magnet material through gates according to the first embodiment.
Figure 6:
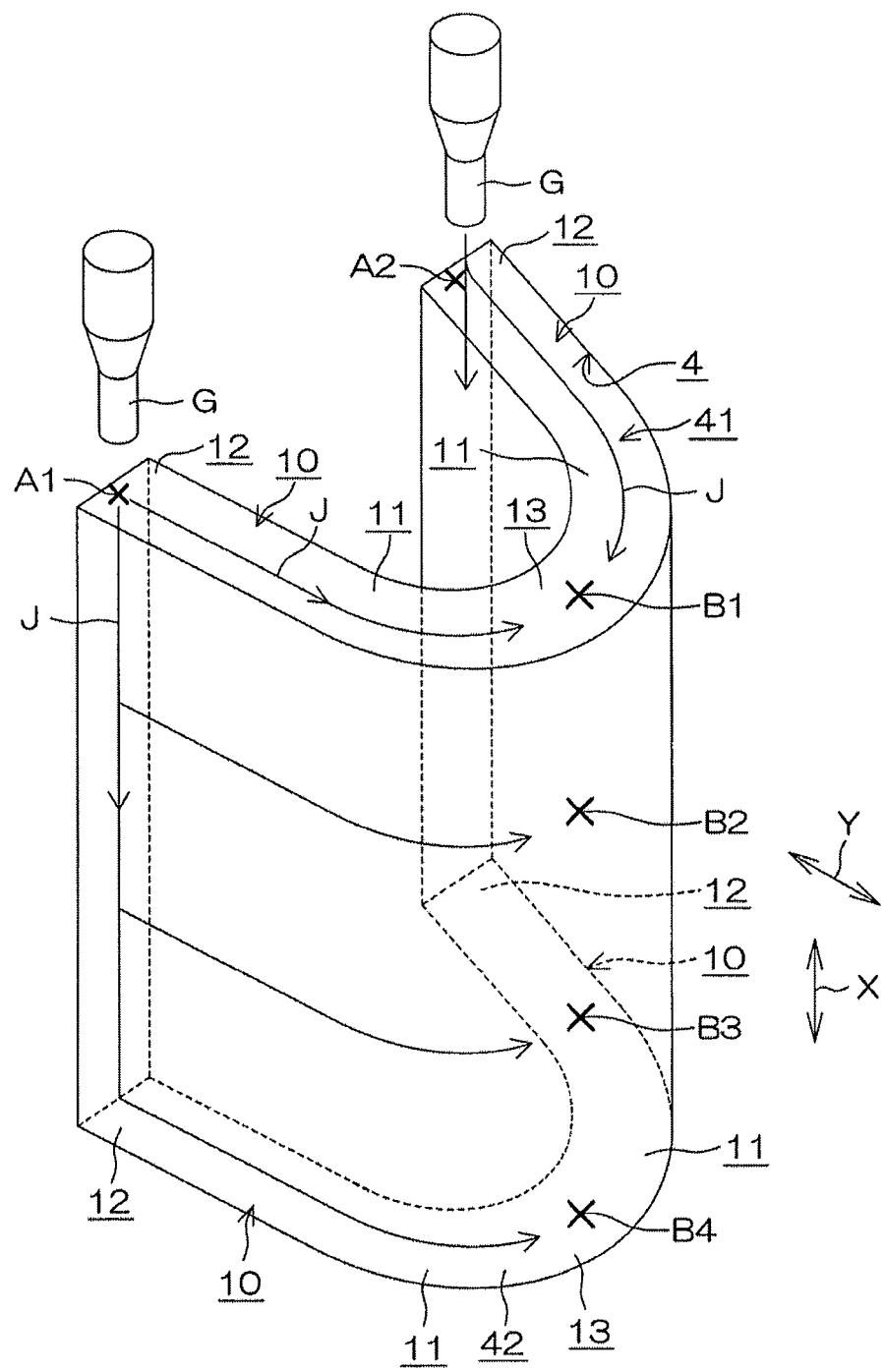
FIG. 6 is a schematic perspective view of an axial hole according to the first embodiment, showing the flow of the magnetic magnet material that is injected into the axial hole through the gates.

The mold 50 includes gates G located in the upper mold 51 so that a resin magnet material is injected through the gates G The upper mold 51 has a sprue S and a runner R. A molten resin magnet material J (see FIG. 5) is supplied from an injection molding machine, not shown, to the gates G through the sprue S and the runner R. As shown in FIG. 6, the gates G are located so as to face the second ends 12 (the ends located closer to the outer periphery of the rotor core 2) of the linear portions 10 in the first opening 41 of the axial hole 4.

Figure 7:
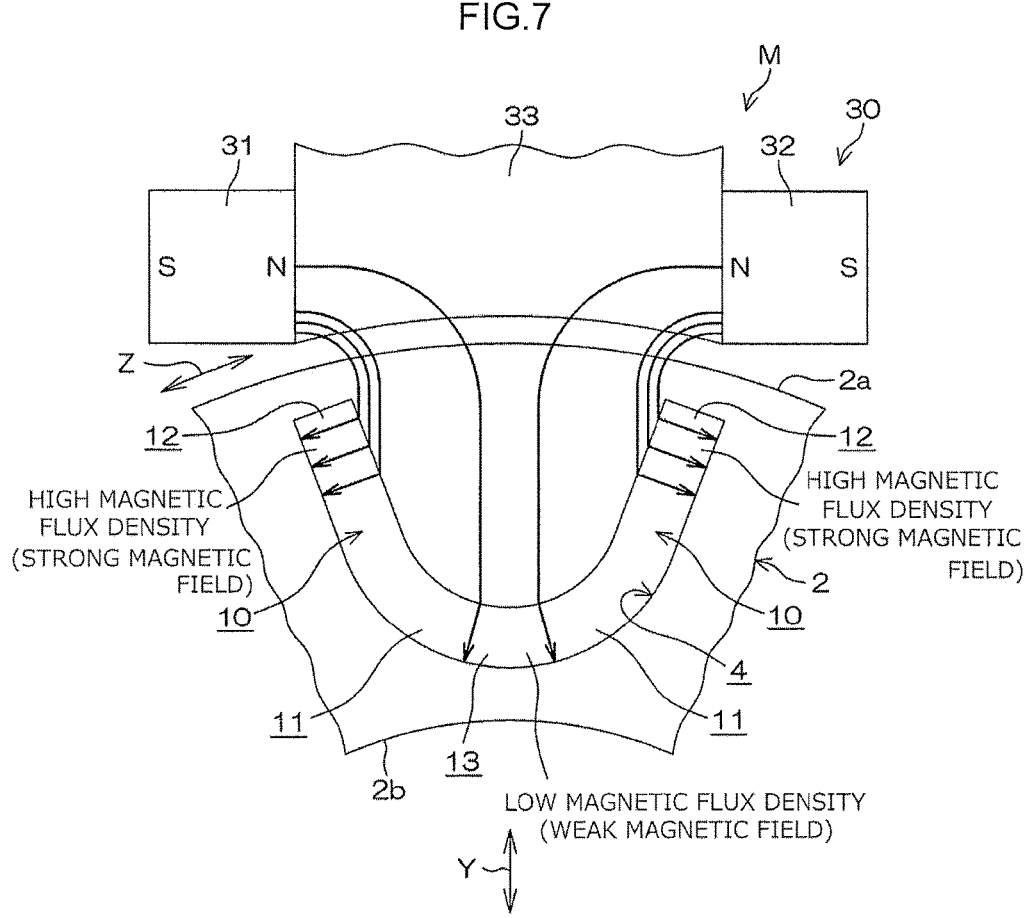
FIG. 7 is a schematic sectional view of an orienting/magnetizing device and a main part of the rotor core according to the first embodiment, illustrating the strength of a magnetic field that is applied from the orienting/magnetizing device to each part of the axial hole of the rotor core.

As shown in FIG. 4, the mold 50 includes an orienting/magnetizing device 30 placed in the intermediate mold 52 surrounding the outer peripheral surface 2a of the rotor core 2. As shown in FIG. 7, the orienting/magnetizing device 30 includes a pair of permanent magnets 31, 32 and an iron core 33 which are located radially outward of the axial hole 4. The permanent magnets 31, 32 are separated from each other in the circumferential direction Z. The iron core 33 is placed between the permanent magnets 31, 32.

Polarities of the permanent magnets 31, 32 are reversed in the circumferential direction Z. The iron core 33 is placed so as to face a corresponding one of the axial holes 4 of the rotor core 2 in the radial direction Y. An orienting magnet field and a magnetizing magnet field from the orienting/magnetizing device 30 via the iron core 33 are applied in the radial direction Y of the rotor core 2. FIG. 7 schematically shows how magnetic flux from each permanent magnet 31, 32 is distributed in each part of the axial hole 4. In the axial hole 4, the magnetic flux density in the bottom portion 13 and the first ends 11 of the linear portions 10 is lower than that in the second ends 12 of the linear portions 10.

That is, the second ends 12 of the linear portions 10 are subjected to a strong magnetic field. The bottom portion 13 and the first ends 11 of the linear portions 10 are subjected to a magnetic field weaker than that at the second ends of the linear portions 10. As shown in FIG. 5, the resin magnet material J is injected into the axial holes 4 through the gates G after the rotor core 2 is placed in the mold 50. That is, the fluidized resin magnet material J is injected through the gates G facing the second ends 12 (see FIG. 6) of the linear portions 10 into the first opening 41 of each axial hole 4 in the first axial end face 21 of the rotor core 2 while being subjected to the orienting magnet field shown in FIG. 7.

As shown in FIG. 6, the resin magnet material J injected through the gates G into each axial hole 4 passes through positions A1, A2 located at the second ends 12 of the linear portions 10 in the first opening 41 facing the gates G. The resin magnet material J then moves in the axial direction X and moves also to positions near the bottom portion 13 (positions B1 to B4).

The position B1 is a position corresponding to the bottom portion 13 in the first opening 41. The position B4 is a position corresponding to the bottom portion 13 in the second opening 42. The positions B2, B3 are intermediate positions between the positions B1 and B4 in the axial direction X.

Magnets typically have such magnetization characteristics that the magnets maintain residual magnetization corresponding to magnetization intensity of the strongest magnetic field the magnets have ever experienced. Accordingly, a resin magnet portion, which is formed as the resin magnet material J moves via the positions A1, A2 with a strong magnetic field to the positions B1 to B4 with a weak magnetic field and becomes solidified, maintains residual magnetization due to high orientation and high magnetization the resin magnet material J experienced when passing through the positions A1, A2 with a strong magnetic field. According to the IPM rotor 1 of the present embodiment, as shown in FIG. 1A, the gate marks 9 are located on the second ends 72 (the ends located closer to the outer periphery of the rotor core 2) of the linear portions 7 on the first axial end face 5 of each resin magnet 3. When a resin magnet portion is formed in the first end 71 of the linear portion 7, the fluidized resin magnet material J is strongly magnetized when it passes through a strong magnetic field region, namely through the positions in the axial hole 4 which correspond to the position of the second end 72. While maintaining residual magnetization due to the strong magnetization, the resin magnet material J moves to the positions in the axial hole 4 which correspond to the first end 71 (positions B1 to B4 in FIG. 6) and becomes solidified to form the resin magnet portion.

That is, the resin magnet portion formed in the first end 71 is magnetized at a magnetization rate as high as that of a resin magnet portion formed in the second end 72. Accordingly, the overall magnetization rate of the resin magnet 3 can be increased, and the overall magnetic flux density of the IPM rotor 1 can be increased. According to the IPM rotor 1, each resin magnet 3 has, e.g., a V-shape (or U-shape or arc-shape) having the linear portions 7 adjoining each other in the circumferential direction and the bottom portion 8 connecting the first ends 71 of the linear portions 7. The gate marks 9 are located on the second ends 72 of the linear portions 7 on the first axial end face 5 of each resin magnet 3.

When the resin magnets 3 having a V-shape etc. is molded during manufacturing, the resin magnet material J is introduced into each axial hole 4 through the pair of gates G. A larger amount of resin magnet material J can therefore be introduced into the axial holes 4 per unit time than in the case where the resin magnet material is introduced into each axial hole through only one gate, whereby cycle time can be reduced. Manufacturing cost of the IPM rotor 1 can thus be reduced.

According to the method for manufacturing an IPM rotor of the present embodiment, as shown in FIG. 6, a resin magnet portion is formed in the first end 11 of the linear portion 10 of the axial hole 4 as the fluidized resin magnet material J is first strongly magnetized by the strong magnetic field in the second end 12 (the end located closer to the outer periphery of the rotor core 2) of the linear portion 10 and then moves to the positions in the first end 11 (positions B1 to B4 in FIG. 6) and becomes solidified. The resin magnet portion formed in the first end 11 of the linear portion 10 is therefore magnetized at a magnetization rate as high as that of the resin magnet portion formed in the second end 12 of the linear portion 10. Accordingly, the overall magnetization rate of the resin magnet 3 can be increased, and the overall magnetic flux density of the IPM rotor 1 can be increased.

According to this manufacturing method, the gates G face the second ends 12 of the linear portions 10 in the first opening 41 of each axial hole 4. That is, the resin magnet material J is injected into each axial hole 4 through the pair of gates G. A larger amount of resin magnet material J can therefore be introduced into the axial holes 4 per unit time than in the case where the resin magnet material is introduced into each axial hole 4 through only one gate, whereby cycle time can be reduced.

Figure 8:
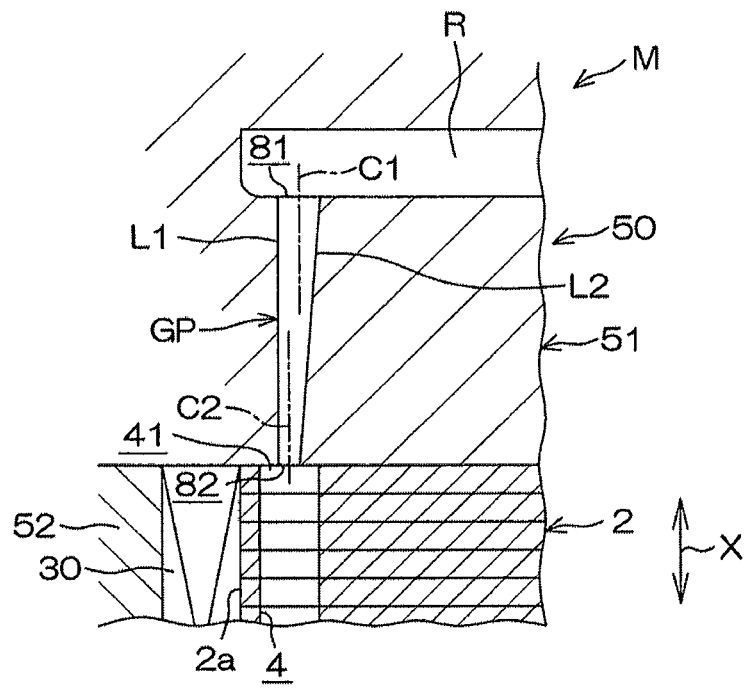
FIG. 8 is a sectional view of a region around a gate of an apparatus for manufacturing an interior permanent magnet rotor according to a second embodiment of the present invention.

A second embodiment of an apparatus for manufacturing an IPM rotor according to the present invention will be described with reference to FIG. 8. The shape of a gate GP is improved in an apparatus M for manufacturing an IPM rotor according to the second embodiment shown in FIG. 8. For example, the gate GP is a pin gate, and includes an inlet passage 81 and an outlet passage 82. The outlet passage 82 faces the second end 12 of the linear portion 10. The center C2 of the outlet passage 82 is offset toward the outer periphery of the rotor core 2 with respect to the center C1 of the inlet passage 81.

Specifically, the gate GP has a tapered shape in section so that the center C2 of the outlet passage 82 is offset toward the outer periphery of the rotor core 2 with respect to the center C1 of the inlet passage 81. The gate GP has a single-tapered shape in section so that an outline L1 near the outer periphery of the rotor core 2 is parallel to the axial direction X of the rotor core 2 and an outline L2 near the inner periphery of the rotor core 2 is tilted with respect to the axial direction of the rotor core 2.

The fluidized resin magnet material J introduced through the inlet passage 81 of the gate GP is supplied from the outlet passage 82 into the axial hole 4 through the second end 12 of the linear portion 10 of the axial hole 4 of the rotor core 2. In the second embodiment, the center C2 of the outlet passage 82 is offset toward the outer periphery of the rotor core 2 with respect to the center C1 of the inlet passage 81. The fluidized resin magnet material J is therefore strongly magnetized by the stronger magnetic field as it passes through the outlet passage 82 of the gate GP. The fluidized resin magnet material J that has passed through the outlet passage 82 of the gate GP passes through a region closer to the orienting/magnetizing device 30, namely a region having a stronger magnetic field, when it passes through the axial hole 4. The fluidized resin magnet material J is thus strongly magnetized by the stronger magnetic field. The fluidized resin magnet material J then moves to the first end 11 of the linear portion 10 of the axial hole 4 and becomes solidified.

The resin magnet portion formed in the first end 11 of the linear portion 10 is therefore magnetized at a magnetization rate as high as that of a resin magnet portion formed in the second end 12 of the linear portion 10. Accordingly, the overall magnetization rate of the resin magnet 3 that is produced can be increased, and the overall magnetic flux density of the IPM rotor 1 can be increased. Moreover, with a simple change in gate shape, namely by forming the gate GP having a tapered shape in section, the center C2 of the outlet passage 82 of the gate GP can be offset toward the outer periphery of the rotor core 2 with respect to the center C1 of the inlet passage 81 of the gate GP. Since the gate G has a tapered shape in section, the sectional area of the passage of the gate GP decreases as the passage extends to the outlet passage 82 of the gate GP. The size of the gate marks can therefore be reduced.

Figure 9:
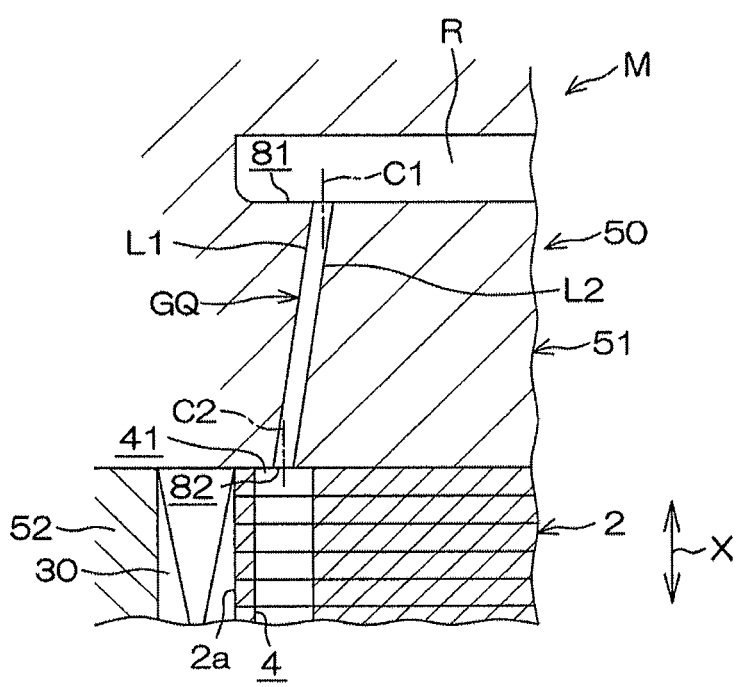
FIG. 9 is a sectional view of a region around a gate of an apparatus for manufacturing an interior permanent magnet rotor according to a third embodiment of the present invention.

A third embodiment of an apparatus for manufacturing an IPM rotor according to the present invention will be described with reference to FIG. 9. Although the gate GP of the second embodiment has a tapered shape in section, the gate GQ of the third embodiment has a linear shape in section. Specifically, in the section of the gate GQ, the outline L1 near the outer periphery of the rotor core 2 and the outline L2 near the inner periphery of the rotor core 2 are tilted at the same angle with respect to the axial direction of the rotor core 2. The sectional area of the passage of the gate GQ is therefore constant.

The present invention is not limited to the above embodiments. For example, the gate mark 9 needs only to be formed on at least one of the first axial end face 5 and the second axial end face 6. In the case where the resin magnet 3 has the pair of linear portions 7 and the bottom portion 8 and has a V-shape, a U-shape, or an arc shape, the gate mark 9 needs only to be formed on at least one of the second ends 72 of the linear portions 7 on the axial end face 5 or 6 on which the gate mark 9 is formed.

The resin magnets may have a W-shape or an angular U-shape. Although not shown in the figures, each resin magnet may be formed by a single linear portion. In this case, the linear portions of the plurality of resin magnets may be disposed in a radial pattern so as to extend in the radial direction of the rotor core. In the second and third embodiments, the gate is a pin gate. However, the present invention is not limited to this. The gate may be a submarine gate or a disc gate.

In the above embodiments, the rotor core 2 is formed by using the electromagnetic steel sheets 20. However, the rotor core may be formed by using other soft magnetic materials such as soft magnetic iron. The orienting/magnetizing device may use a configuration that generates pulses as an orienting magnetic field and a magnetizing magnetic field (e.g., a coil). Various modifications can be made without departing from the spirit and scope of the present invention.

What is claimed is:

1. An interior permanent magnet rotor, comprising:
   a cylindrical rotor core having an axial hole; and
   a resin magnet that is formed to fill the axial hole by injection molding and that has a pair of axial end faces, wherein
   the resin magnet includes a pair of linear portions and a bottom portion, each of the pair of linear portions having a linear shape in a cross section perpendicular to an axial direction of the rotor core, each of the pair of linear portions having, in the cross section, a first end and a second end, the second ends being located closer to an outer periphery of the rotor core than the first ends, and the bottom portion connecting the first ends of the pair of linear portions, and
   gate marks are located on the second ends of the pair of linear portions on at least one of the axial end faces of the resin magnet.

2. The interior permanent magnet rotor according to claim 1, wherein
   the resin magnet has a V-shape, a U-shape, or an arc shape, and
   the pair of linear portions adjoin each other in a circumferential direction of the rotor core.

3. A method for manufacturing an interior permanent magnet rotor, comprising:
   placing in a mold a cylindrical rotor core having an axial hole, the axial hole having a pair of linear portions and a bottom portion, each of the pair of linear portions being linear in a cross section perpendicular to an axial direction of the rotor core, each of the pair of linear portions having a first end and a second end in the cross section, the second ends being located closer to an outer periphery of the rotor core than the first ends, and the bottom portion connecting the first ends of the pair of linear portions; and
   injecting a fluidized resin magnet material into the axial hole of the rotor core through gates facing the second ends of the pair of linear portions while applying an orienting/magnetizing magnetic field in a radial direction of the rotor core.

4. The method according to claim 3, wherein
   the axial hole has a V-shape, a U-shape, or an arc shape, and
   the pair of the linear portions adjoin each other in a circumferential direction of the rotor core.

5. An apparatus for manufacturing an interior permanent magnet rotor, comprising:
   a mold having a cavity in which a cylindrical rotor core having an axial hole is to be placed, the axial hole having a linear portion extending in a cross section perpendicular to an axial direction of the rotor core, and the linear portion having, in the cross section, a first end and a second end, the second end being located closer to an outer periphery of the rotor core than the first end, wherein
   the mold includes an orienting/magnetizing device that applies an orienting/magnetizing magnetic field in a radial direction of the rotor core, and a gate which has an inlet passage and an outlet passage facing the second end of the linear portion and through which a fluidized resin magnet material is introduced into the axial hole of the rotor core, and a center of the outlet passage is offset toward the outer periphery of the rotor core with respect to a center of the inlet passage.

6. The apparatus according to claim 5, wherein
   the gate has a tapered shape in section so that the center of the outlet passage is offset toward the outer periphery of the rotor core with respect to the center of the inlet passage.

* * * * *